United States Patent Office 3,674,425
Patented July 4, 1972

3,674,425
PROCESS FOR PREPARING A SYNTHETIC
CRYSTALLINE ZEOLITE
Harry Edwin Robson, Baton Rouge, La., assignor to
Esso Research and Engineering Company
No Drawing. Continuation of application Ser. No.
553,287, May 27, 1966. This application Apr. 2,
1969, Ser. No. 812,929
Int. Cl. C01b 33/28
U.S. Cl. 23—113  3 Claims

ABSTRACT OF THE DISCLOSURE

A crystalline zeolite having the formula $$1.0 \pm 0.1 [x\text{Na}_2\text{O}: (1-x)\text{Rb}_2\text{O}]:\text{Al}_2\text{O}_3:6.5 \pm 1.0\text{SiO}_2:y\text{H}_2\text{O}$$

wherein $x$ has a value of about 0.25 to 0.75 and $y$ has a value of from 0 to about 10, and an X-ray diffraction pattern similar to that of the mineral erionite, is prepared by digesting a reaction mixture containing $SiO_2$, $Al_2O_3$, $Na_2O$, $Rb_2O$, and $H_2O$ from suitable source materials in specified proportions at a temperature of from about 80° C. to about 150° C. The zeolite product is useful as a selective adsorbent, for example, in the separation of n-hexane or n-octane from their isomers.

CROSS REFERENCES TO RELATED APPLICATION

This application is a continuation of Ser. No. 553,287, filed May 27, 1966, now abandoned.

This invention relates to a novel composition of matter and to a process for preparing same. More particularly, the invention relates to a novel synthetic crystalline alumino-silicate zeolite having a crystal structure similar to the naturally-occurring mineral erionite, said crystalline zeolite containing rubidium.

Crystalline alumino-silicate zeolites, commonly referred to as "molecular sieves," are now well known in the art. These materials are characterized by a very highly-ordered crystalline structure arranged in such a manner as to result in uniformly-dimensioned pores. The crystal structure of these zeolites involves a three-dimensional framework of $SiO_4$ tetrahedra, which is crosslinked by the sharing of oxygen atoms so that the ratio of oxygen atoms to the total of aluminum and silicon atoms is equal to 2. The electronegativity of these tetrahedra is balanced by the presence within the crystal of cations, usually alkali metal cations, such as sodium and potassium ions. The term "molecular sieves" is derived from the characteristic of these crystalline zeolite materials to selectively adsorb or reject molecules on the basis of their size, form and type. Thus, the openings or pores of the crystalline zeolites, formed by the expulsion of water of hydration originally occupying these sites, will determine the particular molecular separation achievable with the particular zeolite. A number of synthetic crystalline zeolites have been prepared, as described, for example, in U.S. 3,013,982, wherein they are characterized by their composition and X-ray diffraction characteristics.

The present invention is primarily concerned with a new type of synthetic crystalline alumino-silicate zeolite. One aspect of the invention is to provide a novel synthetic zeolite having useful adsorption, ion exchange and catalytic properties. A further aspect is the definition of a process for preparing this novel composition of the invention. The novel composition of the crystalline zeolite of the invention may be expressed in the terms of its stoichiometric mole ratios of oxides. The general molar formula representative of the zeolites of the invention is as follows:

$$1.0 \pm 0.1 [x\text{Na}_2\text{O}: (1-x)\text{Rb}_2\text{O}]:\text{Al}_2\text{O}_3:6.5 \pm 1.0\text{SiO}_2:y\text{H}_2\text{O}$$

wherein $x$ has a value of about 0.25 to about 0.75, preferably about 0.4 to about 0.6, and $y$ may be any value of from about 0 to about 10. Minor variations in the mole ratios of the oxides within the ranges indicated above will not substantially affect the zeolite crystal structure or properties. In the formula "Na" designates sodium cation derived from the use of sodium hydroxide as a reactant in the preparation of the crystalline zeolite. The sodium cation can be ion exchanged with one or more hydrogen-containing or metal cations. However, it should be noted herein that the above composition, while structurally similar to the mineral erionite, cannot be obtained by a simple exchange of treatment of erionite with rubidium cations, since both the natural and synthetic forms of erionite contain a substantial amount of nonexchangeable alkali metal (e.g. potassium) cations. The rubidium zeolite of the present invention likewise has a substantial amount of its rubidium cations located in nonexchangeable sites, together with sodium cations at exchangeable sites. These sodium cations can be exchanged with various exchangeable cations including monovalent, divalent and trivalent metal cations, particularly those in Groups I, II and III of the Periodic Table. Typical but non-limiting examples of such cations include barium, calcium, cadmium, lithium, magnesium, strontium, zinc, etc., as well as hydrogen and ammonium cations. Suitable exchange techniques, which are now well known in the art and will not be described herein in great detail, are performed without causing a substantial alteration in the basic crystal structure of the zeolite. It should be clearly understood that presence of rubidium in the zeolite structure is attributable to the presence of a rubidium source material inthe reaction mixture from which the zeolite is crystallized. The rubidium cations are thus present as basic building blocks of the inherent crystal framework of the zeolite, as opposed to being weakly held cations introduced by subsequent modification of the zeolite, as in the case of ion exchange of the crystallized product. Modification of the crystallized zeolite subsequent to its formation, using such techniques as metal impregnation or deposition, ion exchange, etc., is to be clearly distinguished from the composition and process of the present invention. While the exchange properties of the zeolites of the invention are similar to those of the prior art, a substantial portion (i.e. about 50%) of the rubidium cations included in the zeolite's crystal framework are not exchangeable.

In addition to their physical composition, the zeolites of the invention can be distinguished on the basis of their X-ray diffraction patterns. In the following table a typical X-ray powder diffraction pattern of a product of the invention is set forth. This pattern was obtained by standard X-ray powder diffraction techniques. The radiation source was a Phillips Electronics X-ray Generator equipped with a high intensity, copper target, X-ray tube operated at 50 kv. and 40 ma. The diffraction pattern was recorded by a Phillips X-ray Spectrometer equipped with proportional counter, pulse height analyzer and strip chart recorder. Flat, compressed powder samples were scanned at ¼° per minute using a 10-second time constant. Interplanar spacings ($d$) were obtained from Bragg Angle $2\theta$ positions of peaks as observed on the strip chart. Intensities were determined by integrating the areas under diffraction peaks after substracting estimated background. Reporter $I/I_1$ values were obtained by dividing these integrated areas by the area of the strongest (100)

line. Only the more significant intensities or peaks are given below.

TABLE I.—X-RAY DIFFRACTION PATTERN OF Rb-ERIONITE

| hkl | d(A°) | I/I₁ |
|---|---|---|
| 100 | 11.48 | 100 |
| 002 | 7.60 | 9.6 |
| 110 | 6.61 | 24.7 |
| 112 | 4.99 | 6.3 |
| 202 | 4.58 | 4.1 |
| 210 | 4.33 | 24.0 |
| 211 | 4.17 | 2.9 |
| 300 | 3.82 | 17.3 |
| 212 | 3.76 | 72.0 |
| 104 | 3.61 | 19.4 |
| 302 | 3.41 | 6.7 |
| 220 | 3.19 | 7.9 |
| 204 | 3.16 | 38.0 |
| 312 | 2.93 | 11.6 |
| 400 } 214 } | 2.86 | 77.0 |
| 401 | 2.819 | 9.4 |
| 402 | 2.681 | 8.1 |
| 006 | 2.536 | 1.4 |
| 410 | 2.499 | 5.6 |
| 215 } 322 } | 2.487 | 22.4 |
| 412 } 116 } | 2.372 | 4.3 |
| 500 } 404 } | 2.294 | 1.3 |
| 330 | 2.206 | 8.7 |
| 216 | 2.190 | 1.3 |
| 332 | 2.119 | 4.1 |
| 422 | 2.084 | 3.6 |
| 512 | 1.987 | 3.5 |
| 504 | 1.964 | 0.7 |
| 008 | 1.901 | 8.7 |
| 108 | 1.877 | 3.1 |
| 520 | 1.836 | 2.8 |
| 514 | 1.812 | 3.7 |
| 416 | 1.782 | 14.5 |
| 612 | 1.703 | 6.4 |
| 440 | 1.655 | 11.6 |
| 530 | 1.637 | 2.2 |
| 614 | 1.588 | 10.2 |
| 622 | 1.556 | 1.5 |

The above X-ray diffraction pattern is similar to that of the natural mineral erionite, except that significant differences indicate a more symmetrical crystal, as evidenced by the appearance of certain stronger intensities or peaks. This is demonstrated in the following table.

TABLE II.—X-RAY DIFFRACTION PATTERN OF Rb-ERIONITE AND NATURAL ERIONITE

| hkl | Intensity Rb-erionite | Intensity Natural erionite |
|---|---|---|
| 100 | 100 | 100 |
| 101 | 1.0 | 8.5 |
| 002 | 9.6 | 7.8 |
| 110 | 24.7 | 40.6 |
| 102 | 0.0 | 4.9 |
| 200 | 0.0 | 5.3 |
| 201 | 0.0 | 6.9 |
| 112 | 6.3 | 0.0 |
| 103 | 0.0 | 4.1 |
| 202 | 4.1 | 5.8 |
| 210 | 24.0 | 25.2 |
| 211 | 2.9 | 10.9 |
| 300 | 17.3 | 14.2 |
| 212 | 72.0 | 40.5 |
| 104 | 19.4 | 21.3 |
| 302 | 6.7 | 0.7 |
| 220 | 7.9 | 16.6 |
| 213 | 0.0 | 6.2 |
| 310 | 0.0 | 6.6 |
| 204 | 38.0 | 12.6 |
| 311 | 2.0 | 3.3 |
| 312 | 11.6 | 6.5 |
| 400 } 214 } | 77.0 { | 26.8 / 21.0 |
| 401 | 9.4 | 21.8 |
| 402 | 8.1 | 7.3 |
| 006 | 1.4 | 1.3 |
| 410 | 5.6 | 5.6 |
| 322 | 22.4 | 8.8 |
| 106 | 0.0 | 1.2 |
| 116 | 4.3 | 0.0 |
| 330 | 8.7 | 4.3 |

The processes for producing synthetic crystalline alumino-silicate zeolites are now well known in the art. They usually involve crystallization of the zeolite from reaction mixtures containing suitable sources of metal oxides including silica and alumina and water. The nature and proportions of the various oxides will determine the type of zeolite obtained, as well as its crystallinity and yield of final produt. In accordance with the present invention, the novel compositions are prepared from reaction mixtures containing the oxides of sodium, rubidium, silicon and aluminum and water, all supplied from suitable source materials. The preferred source of rubidium oxide is rubidium hydroxide, although rubidium carbonate can also be used. The other reactants are supplied from conventional source materials. For example, alumina may be added in the form of sodium aluminate, alumina sol, alumina trihydrate and the like; silica, in the form of sodium silicate, silica gel, silica sol, etc., with silica sol being particularly preferred; sodium oxide as sodium hydroxide, sodium aluminate, sodium silicate, etc. The proportions of these reactants in the initial reaction mixture are determined from the following molar ratios of reactants:

TABLE III

| | Reactant molar ratios | | |
|---|---|---|---|
| | General | Preferred | Particularly preferred |
| $SiO_2/Al_2O_3$ | 8–15 | 8.5–12 | 9–11 |
| $(Na_2O$ plus $Rb_2O)/SiO_2$ | 0.2–0.4 | 0.22–0.35 | 0.24–0.32 |
| $Rb_2O/(Na_2O$ plus $Rb_2O)$ | 0.10–0.50 | 0.15–0.40 | 0.18–0.30 |
| $H_2O/SiO_2$ | 5–15 | 7–12 | 7–11 |

In accordance with the present process, the above reactants are thoroughly mixed at ambient temperature; heated to a temperature of from about 80 to about 150° C., preferably 90 to 125° C., most preferably about 90 to about 110° C.; and held at such temperature for a sufficient period of time to form the crystalline zeolite product. he pressure utilized will usually be about atmospheric pressure in the case of operation at or below 100° C. and will be correspondingly increased at temperatures higher than 100° C., in order to prevent substantial loss of water from the reaction mixture. Typical optimum crystallization times for temperatures of about 90 to 110° C., e.g. 100° C., will be about 48 to about 240 hours, preferably about 72 to 144 hours, more preferably about 72 to 96 hours. Higher temperatures will allow shorter crystallization times. In any case, longer crystallization periods do not adversely affect product yield or crystallinity.

After the formation of the crystalline zeolite phase, the zeolite crystals are filtered from the mother liquor and preferably washed thoroughly until the wash water has a pH of about 10.5 to 11.0. During the washing step the sodium and/or rubidium cations in the zeolite may be partially removed, owing to their exchange with the hydrogen ions in the wash liquid. After the washing step the zeolite crystals are preferably dried in air at a temperature, for example, of about 200 to 260° F. The crystals may be finally activated for use as an adsorbent or as a catalyst support by heating at a temperature of about 500 to 600° F. to thereby drive off water of hydration, leaving a crystalline structure interlaced with canals of molecular dimensions.

In the most preferred embodiment of the invention, the reactants are supplied from the following source materials: silica in the form of silica sol, alumina as alumina trihydrate, rubidium oxide as RbOH and soda as NaOH. The molar ratios of these oxides are set forth in the particularly preferred amounts shown in Table III. A temperature of crystallization of 100° C. is utilized and the crystallization period is continued for about 96 hours or longer.

The invention will be further understood by reference to the following examples.

EXAMPLE 1

General procedure for the preparation of the crystalline zeolites of the invention A series of runs was made by the following typical preparation procedure. An aqueous mother liquor was prepared by dissolving sodium hydroxide containing 75 wt. percent $Na_2O$ and rubidium hydroxide containing 91 wt. percent $Rb_2O$ in water. Alumina trihydrate was added to the hot solution, and stirring was continued at 100 to 105° C. until it dissolved. The resulting liquor was cooled to room temperature and combined with an aqueous sol containing 30 wt. percent $SiO_2$ as colloidal particles 25 mµ diameter or less. The resulting mixture was agitated vigorously to give a uniform viscous hydrogel at ambient temperature, e.g. about 25° C. The amount of each ingredient, namely alumina trihydrate, sodium hydroxide, rubidium hydroxide, colloidal silica sol and water, was adjusted to give the desired molar composition in the resulting reaction mixture. The reaction mixture was heated in a closed vessel to the ultimate crystallization temperature until the product sufficiently crystallized. Regardless of the ultimate temperature, the reaction is preferably conducted in a closed vessel in order to curtail evaporation loss. For temperatures above 100° C. a closed vessel is required. The crystallization reaction was terminated by quenching the reaction mixture with cold water in an amount, for example, of about 2 volumes of 20° C. water per volume of reaction mixture. The crystalline product was separated from its mother liquor by filtration, thoroughly water washed until the effluent wash water had a pH of about 10.5 and finally dried at a temperature of about 130° C.

The following examples describe the preparation of crystalline rubidium erionite using the general procedure just described. The reactant molar ratios, crystallization period, crystallization temperature, etc. were varied as indicated. The crystallization periods shown are not necessarily the shortest possible, but no adverse effects were observed by lengthened periods at the high temperatures. Results are expressed in terms of product crystallinity and product purity. A measure of product quality and an indirect measure of product yield is the crystallinity of the product obtained in any particular run. Percent crystallinity listed in the following examples (e.g. "E–144") refers to the ratio between the sum of the intensities of the ten strongest lines of the X-ray diffracion pattern of the particular sample being measured and the sum of the intensities of the same ten lines for a standard sample of essentially pure natural erionite, multiplied by 100. The sum of the intensities of the ten strongest lines for the standard natural erionite sample was arbitrarily taken to be 100. The X-ray digraction traces for all of the samples measured were recorded under instrument conditions substantially identical to those used for the standard natural erionite reference sample. Crystallinity is thus expressed as a percent of the standard natural erionite sample's crystallinity.

EXAMPLE 2

The general procedure described in Example 1 was followed for the preparation of various samples of crystalline zeolites. In accordance with the present invention, typical runs demonstrating the successful preparation of essentially pure synthetic rubidium erionite in good yield with excellent utilization of reactants are summarized in Table IV below. The molar composition of the reaction mixture from which the erionite product was crystallized is indicated in the table, together with the crystallization temperature and the crystallization time at said temperature. Further indicated are the product crystallinity (e.g. "E–144" means that the sample exhibited 144 percent of the natural erionite sample's crystallinity) and an indication of the magnitude of any extraneous crystalline zeolite contaminant phase, designated either as "chabazite" or "faujasite" (as those terms are known in the art).

The designations "strong," "medium," etc. refer to qualitative estimates of crystallinity determined from examination of the X-ray pattern without precise calculation. Roughly, "strong" is used to designate about 90 to 100% of the crystallinity of the standard erionite sample; "medium," about 40 to 60%; "weak," about 10 to 20%; and "trace," less than 10%.

TABLE IV.—PREPARATION OF SYNTHETIC ZEOLITE

| | Reaction mixture | | | | Crystallization | | Product | |
|---|---|---|---|---|---|---|---|---|
| Run | $SiO_2/Al_2O_3$ | $(Na_2O+Rb_2O)/SiO_2$ | $Rb_2O/(Na_2O+Rb_2O)$ | $H_2O/SiO_2$ | Temperature (° C.) | Hours | Rb-erionite | Extra phases |
| 1 | 10 | 0.30 | 0.20 | 8 | 100 | 216 | E-strong | Chabazite-trace. |
| 2 | 10 | 0.30 | 0.20 | 10 | 100 | 192 | ___do___ | None. |
| 3 | 8 | 0.30 | 0.20 | 8 | 100 | 192 | E-50 | Chabazite-medium. |
| 4 | 8 | 0.27 | 0.20 | 8 | 100 | 480 | E-40 | Do. |
| 5 | 10 | 0.27 | 0.20 | 8 | 100 | 240 | E-144 | None. |
| 6 | 10 | 0.30 | [1] 0.20 | 8 | 100 | 480 | E-128 | None. |
| 7 | 9 | 0.24 | 0.20 | 7.7 | 100 | 288 | E-strong | None. |

[1] $Rb_2O$ added as $Rb_2CO_3$.

EXAMPLE 3

Effect of rubidium oxide content of reaction mixture

As indicated above, operation with the molar ratio ranges described herein produces a novel crystalline alumino-silicate zeolite composition of matter, which is very similar in structure to the naturally-occurring mineral erionite, except for the presence of a minor amount of rubidium oxide. It has been found that the proportion of rubidium oxide in the reaction mixture from which the crystalline zeolite crystallizes has an important effect on the ultimate crystal structure of the product. As the rubidium oxide content of the mixture is decreased below about the 20% level (i.e. where the ratio $$Rb_2O/(Na_2O+Rb_2O)$$

is decreased below about 0.20), crystalline phases other than the desired erionite phase, such as the faujasite and chabazite phases, tend to be formed in greater amounts. This is demonstrated in Table V.

TABLE V.—EFFECT OF Rb₂O CONTENT OF REACTION MIXTURE

| Run | Reaction mixture | | | | Crystallization | | Product | |
|---|---|---|---|---|---|---|---|---|
| | $SiO_2/Al_2O_3$ | $(Na_2O+Rb_2O)/SiO_2$ | $Rb_2O/(Na_2O+Rb_2O)$ | $H_2O/SiO_2$ | Temperature (°C.) | Hours | Rb-erionite | Extra phases |
| 8 | 10 | 0.30 | 0.30 | 8 | 100 | 480 | E-155 | None. |
| 9 | 10 | 0.27 | 0.20 | 8 | 100 | 240 | E-144 | None. |
| 10 | 8 | 0.30 | 0.10 | 7 | 125 | 120 | E-medium | Chabazite-medium. |
| 11 | 10 | 0.27 | 0.10 | 8 | 100 | 192 | do | Faujasite-medium. |
| 12 | 8 | 0.30 | 0.10 | 8 | 150 | 24 | E-weak | Chabazite-medium. |
| 13 | 10 | 0.30 | 0.10 | 8.5 | 100 | 480 | None | Chabazite-strong. |
| 14 | 10 | 0.30 | 0.10 | 8.5 | 100 | 120 | None | Faujasite-medium. |

EXAMPLE 4

To demonstrate the utility of the products of the invention and to compare their adsorption properties with that of the naturally-occurring mineral erionite, a series of adsorption experiments was performed. This example will also serve to demonstrate the exchangeability properties of the products of the invention.

A sample of the synthetic erionite type rubidium-containing zeolite of the invention was prepared by the procedure of Example 2 using the reactant molar ratios indicated in Table IV for Run 2. A portion of this sample was also ion exchanged with an ammonium nitrate solution (10 wt. percent) at a temperature of 180° F. for a total of 5 times. The resulting product had a rubidium content of 8 wt. percent, a sodium content of 0.05 wt. percent and a silica-to-alumina mole ratio of 6.3. Both samples of synhetic erionite type zeolite were then activated by dehydration at a temperature of about 1000° F. at atmospheric pressure.

The adsorption capacities of these two samples, i.e. the rubidium-erionite as prepared and the rubidium-hydrogen-erionite as modified by ion exchange, were then tested for adsorption capacity, together with a sample of naturally-occurring erionite. All three samples were tested by exposure of a weighed sample of activated material to measured quantities of normal octane for a period of 2 hours at 200° F. and 2 mm. Hg residual pressure. Similar experiments were conducted using n-hexane as the adsorbate material. The results are summarized in the following table.

TABLE VI.—ADSORPTION OF n-HEXANE AND n-OCTANE BY PRODUCTS OF THE INVENTION

| Adsorbent | Adsorbate | Weight percent adsorbed |
|---|---|---|
| Natural erionite | n-Hexane | 6.1 |
| Rb-erionite | do | 4.8 |
| Rb-H-erionite | do | 5.8 |
| Natural erionite | n-Octane | 2.6 |
| Rb-erionite | do | 4.8 |
| Rb-H-erionite | do | 5.1 |

As indicated, the products of the present invention can be utilized as adsorbents, for example, in the separation of n-hexane or n-octane from their isomers. It will be observed that the hydrogen form of the rubidium erionite is somewhat superior to the rubidium erionite or the natural erionite with regard to n-octane adsorption capacity and about equal to the natural erionite with respect to n-hexane adsorption capacity.

What is claimed is:

1. A process for preparing a synthetic crystalline zeolite having the following molar composition:

$$1.0 \pm 0.1 [x\ Na_2O : (1-x)Rb_2O] :$$
$$Al_2O_3 : 6.5 \pm 1.0 SiO_2 \cdot yH_2O$$

wherein $x$ has a value of about 0.25 to about 0.75 and $y$ has a value of from about 0 to about 10, said zeolite having an X-ray diffraction pattern essentially the same as that shown in Table I, which process comprises crystallizing said zeolite from an aqueous reaction mixture containing soda, silica and alumina, wherein the molar ratios of the constituents in the reaction mixture are within the following ranges:

| | |
|---|---|
| $SiO_2/Al_2O_3$ | 8.5–12 |
| $(Na_2O+Rb_2O)/SiO_2$ | 0.22–0.35 |
| $Rb_2O)/Na_2O+Rb_2O)$ | 0.15–0.40 |
| $H_2O/SiO_2$ | 7–12 | and maintaining said mixture at a temperature of between about 80 and 150° C. until the desired crystalline zeolite product is formed.

2. A process for preparing a synthetic crystalline zeolite having the following molar composition:

$$1.0 \pm 0.1 [x\ Na_2O : (1-x)Rb_2O] :$$
$$Al_2O_3 : 6.5 \pm 1.0 SiO_2 : yH_2O$$

wherein $x$ has a value of about 0.25 to about 0.75 and $y$ has a value of from about 0 to about 10, said zeolite having an X-ray diffraction pattern essentially the same as that shown in Table I, which process comprises preparing an aqueous reaction mixture containing soda, silica and alumina in the following molar ratios:

| | |
|---|---|
| $SiO_2/Al_2O_3$ | 9–11 |
| $(Na_2O+Rb_2O)/SiO_2$ | 0.24–0.32 |
| $Rb_2O/(Na_2O+Rb_2O)$ | 0.18–0.30 |
| $H_2O/SiO_2$ | 7–11 | heating said reaction mixture to a temperature of from about 80 to about 150° C. and maintaining said mixture at said temperature for a sufficient period of time to form said crystalline zeolite.

3. The process of claim 2 wherein silica is supplied by a colloidal silica sol, alumina is supplied by alumina trihydrate, rubidium oxide is supplied by rubidium hydroxide and soda is supplied by sodium hydroxide.

References Cited

UNITED STATES PATENTS

| 2,950,952 | 8/1960 | Breck et al. | 23—113 |
| 3,248,170 | 4/1966 | Kvetinskas | 23—111 |

OTHER REFERENCES

Barrer et al (I): "J. Chem. Soc." (1953) pp. 4035–4041.
Barrer et al. (II): "J. Chem. Soc." (1956) pp. 2892–2903.
Barrer et al. (III): "J. Physical Chem." vol. 68, No. 11, November 1964, pp. 3427–3429.
Eberly: "The American Mineralogist" vol. 49, January-February 1964, pp. 30–40.

EDWARD J. MEROS, Primary Examiner

U.S. Cl. X.R.

252—455 Z